Jan. 29, 1963   E. B. MYERS   3,075,432
SELECTIVE COLOR FILTER
Filed May 3, 1954   3 Sheets-Sheet 1

Inventor:
Elman B. Myers
by Kenyon & Kenyon
Att'ys.

Jan. 29, 1963   E. B. MYERS   3,075,432
SELECTIVE COLOR FILTER
Filed May 3, 1954   3 Sheets-Sheet 2
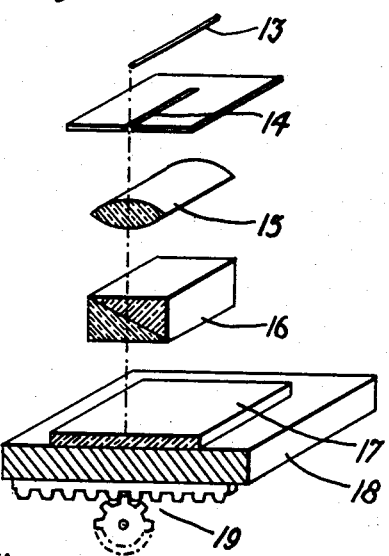
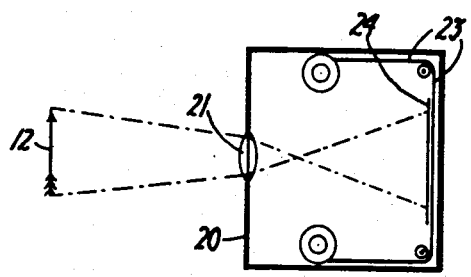
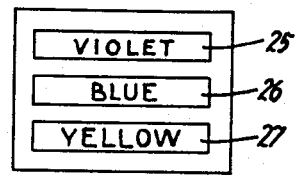
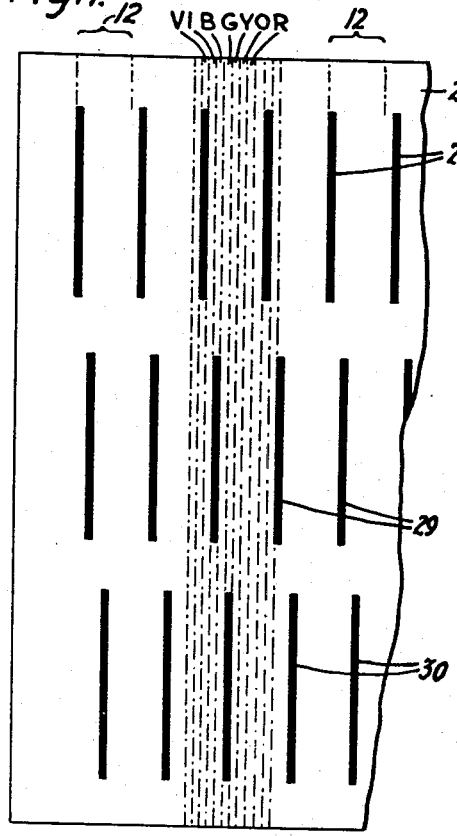
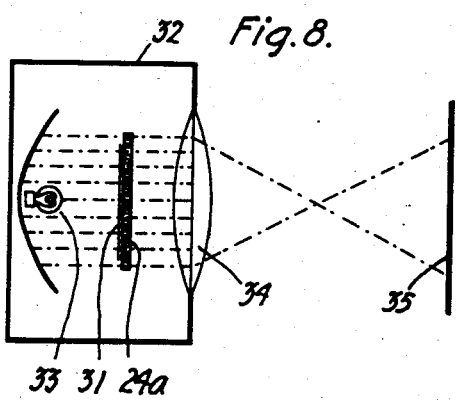
Inventor:
Elman B. Myers
by Kenyon & Kenyon
Att'ys

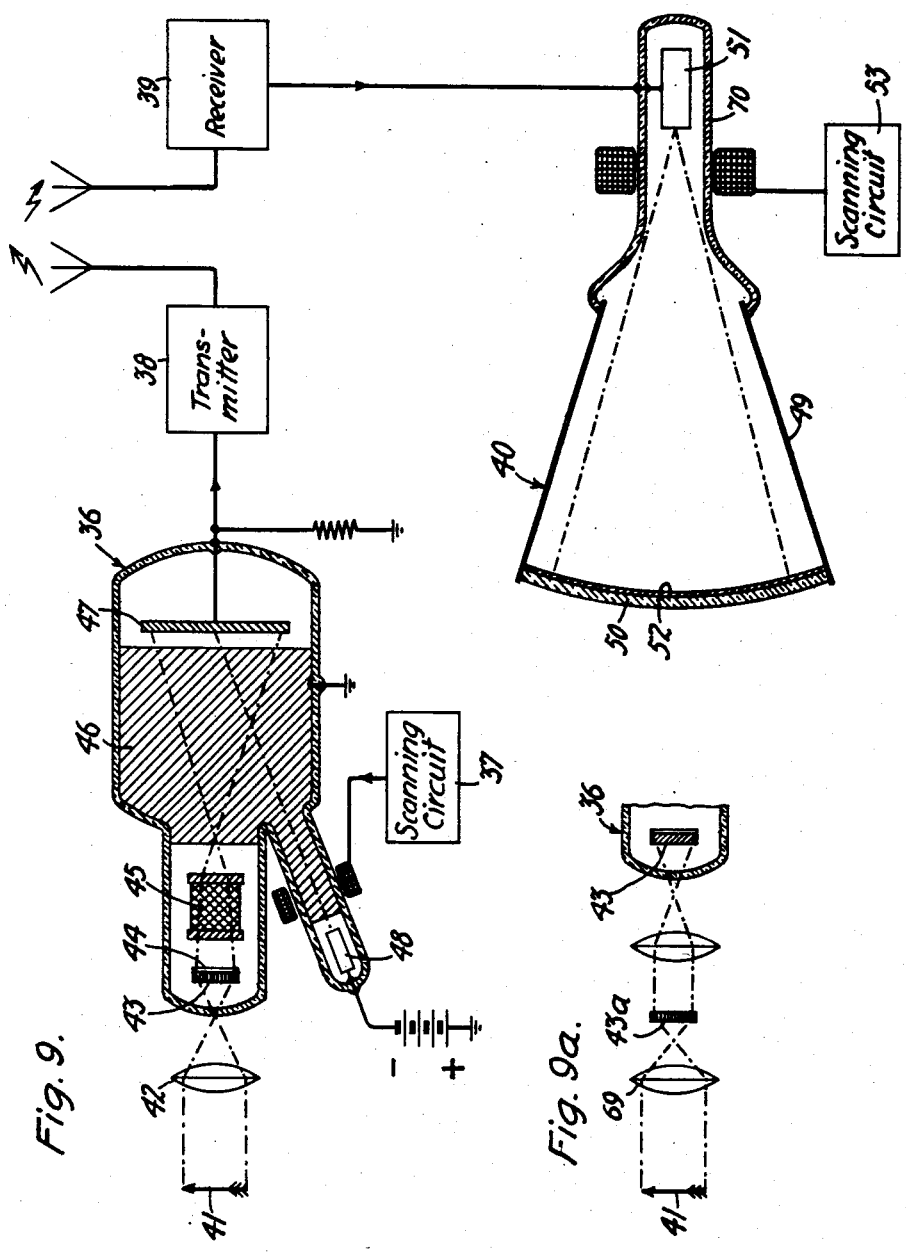

United States Patent Office 3,075,432
Patented Jan. 29, 1963

3,075,432
SELECTIVE COLOR FILTER
Elman B. Myers, Pompton Lakes, N.J., assignor to Scarborough Associates, Inc., New York, N.Y., a corporation of New York
Filed May 3, 1954, Ser. No. 427,225
2 Claims. (Cl. 88—111)

The present invention relates generally to a method and apparatus for producing images in their natural colors and more particularly to the creation of realistically-colored photographic, television and facsimile iamges.

When directly viewing a scene, the eye of the observer will discern five characteristics of the illuminated areas which compose the scene. These characteristics are (a) the relative brightness or tonal content of the areas, (b) their geometric or structural content, (c) the motion of the geometric structure, (d) their color or chromatic content and (e) their apparent position or stereoscopic content. Ideally, a reproduction system affording accurate representations with respect to all five characteristics will recreate the scene with complete fidelity. It is well-recognized, however, that the adaptive power of the mind is such that it can reconstitute a scene even on the basis of limited information respecting these characteristics.

Also well-known in the visual arts is that the objects in a scene can be distinguished by characteristics independent of their geometric shapes, such distinctions being grounded on color quantities. These quantities are the brightness of the object, that is, the degree of lightness or darkness it exhibits, the hue or color purity of the object (redness, greenness, etc.) and the saturation or extent to which the hue is diluted by white light. In black-and-white photography and television, the picture or screen image produced is deficient in all color quantities other than brightness. Hence, these pictures or images are composed of varying shades of gray, ranging between the extremes of absolute white and black.

In black-and-white photography, a light-sensitive film is used to produce a negative of the scene in graduated shades of gray, this negative then being converted into a positive print. In black-and-white television, an image in varying shades of gray is formed by scanning successive lines on a fluoroscent screen with an electron beam whose intensity is modulated in accordance with video signals corresponding to the varying brightness of elemental areas of the scene.

Normal vision is, of course, color vision. Color vision is realistic vision in that the full emotive and psychological effects of the scene are impressed on the mind of the observer. Conventional color photographic and television techniques are based on the trichromatic theory of vision in which the retina of the human eye is said to comprise three different types of light-sensitive elements: one responsive to light wavelengths corresponding to blue, one to green and one to red. It is known that any given color can be matched very closely by a combination of three primary colors. These color combinations can be formed by the additive method or the subtractive method. In the additive method, the primary colors exist as separate entities produced by sources such as filters located side by side, the color lights from the three sources falling either simultaneously or in rapid sequence on a common viewing surface.

All existing color television systems exploit this additive principle of combining colors. In the simultaneous system of color television, the three primary color images exist side by side and are projected one over another on a viewing screen, whereby they fall in superimposed relation in the retina of the eye. In sequential color television, only one primary color is present at any one instant, but the three primary colors are exhibited in such rapid succession that the effect is the same as that of continuous illumination by all colors.

In the subtractive technique, the mixture is produced by subtracting a particular hue from white light, leaving the remaining hues of the spectrum which together produce the visual sensation of a complex color mixture. Subtractive primaries are combined by placing the pigments, dyes or filters one on top of the other and passing white light through them. This technique is typified by the Kodachrome photographic transparency.

Black-and-white techniques entail relatively simple apparatus. Color systems of the type heretofore known, on the other hand, are generally highly complex, expensive and difficult to operate. Thus, in the sequential color-television system, rotating color wheels are required at both transmitter and receiver which must be synchronously operated. In the simultaneous color-television system, three camera tubes are arranged to view the object from the same vantage point via system of color-selective mirrors which direct light from the scene along separate paths so that the red, green and blue light components of the object impinge on separate camera tubes. The signals developed by the three camera tubes are fed via separate transmission channels or by multiplex operation to a receiver. The receiver must be provided either with separate tubes having color-producing phosphors whose images are optically combined to form a colored image on a screen, or with a so-called tricolor tube possessing three electron beams exciting phosphor dots or lines generating lights in different colors.

Obviously, a system of this type is of far greater complexity than a black-and-white system employing a single camera tube at the transmitter terminal and a straight forward kinescope at the receiver terminal. The optical and electronic complexity of known color systems militate against their widespread commercial acceptance despite their manifest disarbility as compared to black-and-white systems. Moreover, to adopt a color system would entail a tremendous financial loss in existing black-and-white transmitter and studio facilities, to say nothing of the cost to millions of home viewers in replacing existing black-and-white receivers with color receivers.

Accordingly, it is the chief object of this invention to provide a new method and apparatus for creating pictures or images in their natural colors, wherein the above-described disadvantages of prior-art systems are obviated.

More particularly, it is an object of the invention to provide a system for producing images and pictures in their natural colors, based on the principle of color analysis and making use of a standard black-and-white film or television camera apparatus. A significant feature of the invention resides in the fact that the system affords depth-perception effects.

Yet, another object of the invention is to provide an ultra-microchrome analyzer for the color analysis of an optical image.

It is still another object of the invention to provide a color-television system fully compatible with existing black-and-white systems and making use of standard black-and-white electronic apparatus in co-operation with an ultra-microchrome analyzer. Thus, existing black-and-white transmitting and receiving terminal equipment may be retained, the system being converted to color simply by the addition of an ultra-microchrome analyzer to the camera tube at the transmitter and the picture tube at the receiver.

Yet, another object of the invention is to provide high-speed photographic cameras using conventional black-and-white film to produce a color-analyzed negative which when converted to a positive and viewed through an ultra-microchrome analyzer is transformed into a colored image.

For a better understanding of the invention as well as other objects and further features thereof, reference is had to the following detailed description to be read in connection with the accompanying drawing, wherein like components in the several views are identified by like reference numerals.

In the drawing:

FIG. 4 illustrates schematically the method of manufacturing an analyzer, in accordance with the invention.

FIG. 5 illustrates schematically a photographic camera device adapted to produce a color-analyzed black-and-white negative.

FIG. 6 is a simplified scene to illustrate the operation of the camera.

FIG. 7 is a sketch illustrating the behavior of the ultra-microchromatic analyzer in response to light derived from the scene shown in FIG. 6.

FIG. 8 illustrates schematically a projector device for converting a color-analyzed black-and-white positive film to a colored picture.

FIG. 9 illustrates schematically the transmitter and receiver of a color-television system, in accordance with the invention.

FIG. 9a is a modification of the camera arrangement shown in FIG. 9.

The present invention, in contradistinction to the additive and subtractive techniques heretofore forming the basis for color television and photography, makes use of a novel process of color micro-analysis. Accordingly, a brief summary of basic color theory will assist materially in understanding the principles underlying the invention.

Light is but one of a number of known forms of radiant energy which travel with wave motion. When radiant energy of all wave lengths in the region between approximately 400 and 700 milli-microns are presented to the human eye in certain nearly-equal quantities, we receive the sensation of colorless or white light, the same white light of the black-and-white television picture tube when the electron beam excites the phosphors on the screen. Conversely, when a white light is analyzed or rationalized into its constituent radiations, the resulting gamut of color lights is called the visible spectrum of light. Inspection of the spectrum reveals that waves of different wave lengths display different hues. In order of decreasing wave lengths, these hues are red, orange, yelow, green, blue, indigo and violet. Each hue in the spectrum blends by insensible gradations in shade into the next hue.

Figure 1:
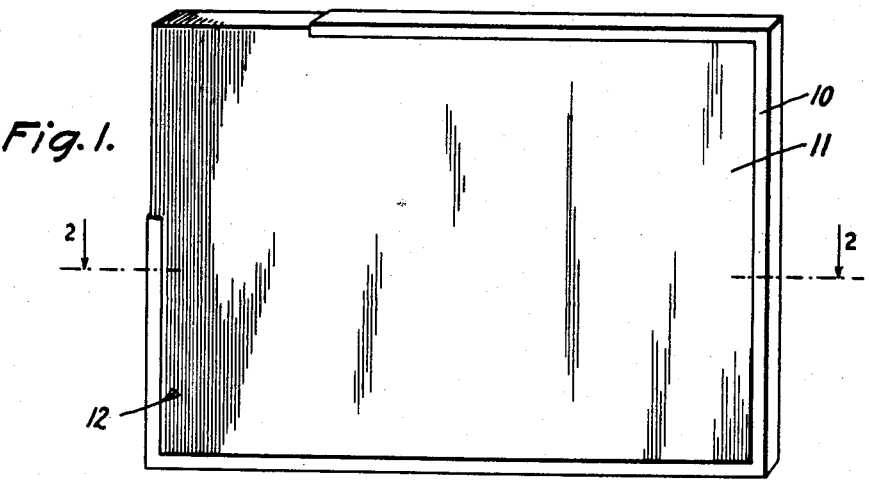
FIG. 1 is a perspective view of an ultra-microchrome analyzer, in accordance with the invention.
Figure 2:
FIG. 2 is a section taken along plane 2, 2 in FIG. 1.

In the present invention, light emanating from a scene is effectively dissected by an ultra-microchrome analyzer into a multiplicity of like parallel areas of microscopic width, the light contained within each elemental area being analyzed with respect to its color content. Referring now to FIGS. 1 and 2, there is shown a preferred embodiment of an ultra-microchrome light analyzer, in accordance with the invention, comprising a rectangular frame 10 and a photo-sensitive glass plate 11 supported therein.

Figure 3:
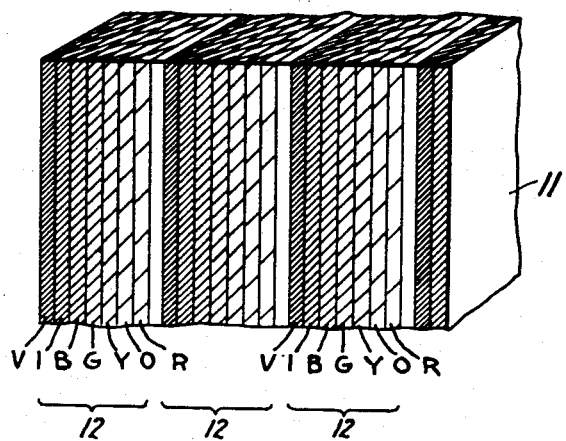
FIG. 3 is a greatly enlarged detail taken from FIG. 1.

Photographically recorded on glass plate 11 is a symmetrical array of repetitive spectral stripes 12 in parallel relation. The stripes 12 are rectilinear in form, of equal width and equal length, and are microscopically separated. Preferably, there are at least 100 stripes formed per inch, and in practice as many as 1,000 stripes per inch may be provided. As best seen in FIG. 3 in greatly magnified form wherein three juxtaposed stripes are shown, each spectral stripe 12 is constituted by a violet band V, an indigo band I, a blue band B, a green band G, a yellow band Y, an orange band O, and a red band R. While FIG. 3 shows each color band as having a distinct boundary, it is to be understood that actually the colors blend imperceptibly into each other, so that no real demarcation exists therebetween. As pointed out above, the array is constituted by at least 100 stripes to an inch, with a minute separation between stripes. Hence, each inch of the analyzer will contain 700 parallel bands of color, of which 100 are violet V, 100 are indigo I, etc. By reason of the extreme proximity of the color-bands, the unaided eye is unable to resolve the colors; hence, an optical fusion will result, thereby imparting to the surface of the glass a uniformly white appearance. If desired, the glass surface may be coated with a surface of low reflection coefficient to eliminate spurious light reflections. Such coatings are well-known in the optical arts.

The ultra-microchrome analyzer is fabricated by repetitive exposure of a photo-sensitive light-permeable surface to a "rational" light spectrum of high purity. By "rational" spectrum is meant one in which the wave-length distribution is uniform in scale. Photo-sensitive metal-colored glass suitable for this purpose is presently available, and its characteristics are fully described, for example, in the article of S. D. Stokey in "Industrial and Engineering Chemistry," vol. 41, page 856, April 1949. In glass of this type, the image is a color transparency consisting of microscopic particles of gold, silver or copper within the glass. Photo-sensitive glass possesses a singular combination of useful properties. Among these are permanence, durability, transparency and other glass qualities, grainless image, exceptional fiidelity of reproduction, and a wide range of tonal contrast. Moreover, the color penetrates into the glass as a function of the time of exposure—hence, it is possible, as shown in FIG. 1, to form each spectral stripe so that it penetrates the full depth of the glass. Each stripe, therefore, is effectively constituted by stacked laminae of different color-bands and serves to analyze the color content of an elemental area of an optical image projected therethrough.

As shown in FIG. 4, one method of manufacturing a master ultra-microchromatic light analyzer free from optical distoration is as follows: a paraxial source 13 of white light is projected through a diffraction slit 14, so constructed that a rational spectrum of high purity is generated which is free from halo or other aberrations. The image of this slit is projected by optical means, such as a symmetrical, astigmatic lens 15 acting in conjunction with a compound rational spectrum prism 16, onto a photosensitive glass plate 17 mounted on the table 18 of a device which is automatically shiftable in prescribed steps, such as a comparator. The table 18 of the comparator is automatically-shiftable by a vernier rack and pinion arrangement 19 or other mechanical means in equally-spaced steps of microscopic dimension to permit repetitive exposure of the plate, each step producing a single spectral stripe. The one-micron spacing is introduced between successive stripes to aid fabrication by micrometer metering. This interval of space is observable only with a microscope of high power, a so-called ultra-microscope, but is otherwise lost by optical fusion. Thus, the over-all pattern of the analyzer appears as a uniform white field. It will be appreciated that the width of the stripe, while microscopic, is substantially greater than the spacing between adjacent stripes.

It is desirable that the making of the analyzer be performed under vibrationless and dust-free conditions. In order to provide seismic isolation, the comparator is preferably mounted on a thick cork base, in turn mounted on a concrete pillar resting on a monolith of natural granite. The operation is conducted in a totally dark room, preferably air-conditioned and temperature-controlled. The master plate thus produced may, of course, be used to make suitable copies in any desired scale.

While the analyzer has been described as formed on a photo-sensitive glass plate, it is to be understood that an analyzer on conventional color plastic or film such as Ecktachrome film may also be manufactured. It is also to be noted that while ordinary color film does not yield a grainless image, the resultant limitation in the number of stripes per inch is not a material drawback in color-television applications and in similar systems wherein a color-analyzer of 500 stripes per inch is adequate to serve all practical requirements. However, it is also possible to use grainless film of the type, for example, employing a cellophane base. It is to be understood that any means to produce an analyzer constituted by rational spectra is within the contemplation of the invention.

The operation of the ultra-microchromatic analyzer will be explained in connection with FIGS. 5, 6 and 7, which illustrates the manner of taking a color-analyzed black-and-white photograph, in accordance with the invention. In FIG. 5, a camera-box 20 is provided, having the usual lens 21 to admit light from an object 22 into the dark box, the optical image being cast on a conventional film 23 having a photo-sensitive surface. The film is of the ordinary type, producing a latent black-and-white negative of high contrast, such as panchromatic film which is generally sensitive to all colors in the spectrum, the negative being darkened in accordance with the brightness of the color impinging thereon. Adjacent the light-sensitive surface of the film and in the path of the light rays is placed an ultra-microchrome analyzer 24. Thus, the light composing the optical image projected on the film first passes through analyzer 24, whereby it is effectively dissected into as many parallel elemental areas of microscopic width as there are stripes on the analyzer. The light constituting each elemental area of the optical image is distributed in position on the corresponding area of the film in accordance with its color content. In other words, each spectral stripe acts as a series of juxtaposed band-pass color filters, each of which passes only the related color in the impinging light and rejects all others. The photographic impression on the developed negative records every spectrum hue in its own fixed position in the spectrum; only such parts of the spectrum are darkened in accordance with the spectral hues contained in the image and are resolved photographically in a density proportionate to their intensity.

It is important to note that the ultra-microchrome analyzer is not a line screen or grating. Each stripe is a "rational" pure spectrum color-selective filter, the minute separation between stripes merely serving to aid fabrication and being lost in optional fusion. In consequence, the image resolution and continuity is equal to the best obtainable in black-and-white photography.

To demonstrate this principle in the simplest manner possible, let us imagine that the scene being photographed consists of nothing more than three parallel neon lights of equal intensity, as shown in FIG. 6, the upper light 25 being pure violet, the middle one 26 being pure blue and the bottom light 27 being pure yellow. Consequently, as illustrated in exaggerated form in FIG. 7, the violet light will filter through the parallel bands of violet V in the stripes 12 of the ultra-michrochrome analyzer to produce equi-spaced black bars 28 across the underlying film, the blue light will ntaurally filter through the blue bands B to form black bars 29, while the yellow light will pass through the yellow bands Y to form black bars 30 across the film.

Although the bars 28, when microscopically viewed, are seen to be distinct from each other, inasmuch as there are at least 100 spectral stripes to an inch, the bars as perceived by the unaided eye are optically fused to form a proper representation of the violet neon light 25. Similarly, the bars 29 and 30 are optically fused when viewed by the unaided eye. Now, should a positive print be made of the negative of the three parallel violet, blue and yellow lights, the positive print would correspond to FIG. 6, that is, it would take the form of a black background with three parallel white strips. As pointed out hereinabove, the fact that each strip of light is actually constituted by a series of separate bars is not apparent to the naked eye; and, to all appearances, the color-analyzed black-and-white negative is identical to the ordinary negative. While the camera has been described as containing the ultra-microchrome analyzer wtihin the box, it is to be understood that the analyzer may also be used on the exterior thereof in conjunction with the lens.

In order to transform the color-analyzed black-and-white negative into a color positive, the following simple procedure may be practiced. The color-analyzed black-and-white negative is first changed by conventional contact-printing techniques into a color-analyzed positive transparency. Then, as shown in FIG. 8, the color-analyzed positive transparency 31 is inserted in a projector 32, including a source of white light 33 producing parallel rays and a projector lens 34 to cast an enlargement of the positive transparency 31 on a screen 35. In contact with transparency 31 is an ultra-microchrome analyzer 24a in frame registration with the analyzer 24 of the camera 20. In other words, referring for a moment to FIG. 7, the analyzer 24a must be positioned so that its color-bands relative to the transparency 31 coincide with those light-bars 28, 29 and 30 on the positive transparency which represent the corresponding colors. Consequently, projected onto screen 35 will be a realistically-colored image of the original scene. Obviously, the same method is suitable for making enlargements. In lieu of projection of the colored images, colored contact prints may readily be made by stacking upon color film or paper, a color-analyzed black-and-white positive transparency and an ultra-microchrome analyzer in frame registration, the color film then being exposed to a white-light source passing successively through the analyzer and the transparency.

The glass microchrome analyzer is preferably given a physical spectral stripe depth of at least one quarter of an inch. This gives rise to true depth, optical sense-perception of color images when viewed through the glass color analyzer. When the analyzer is placed in contact with black-and-white color-analyzed transparency wherein the color information is contained in the gray scale, and flat white light is used to illuminate the transparency, cones of light of varying intensity pass into and through the color analyzer, generating color-depth contrast and resulting in an authentic depth, optical sense-perception effect. Thus, the color images have a three-dimensional quality.

It will be appreciated that the techniques described herein in connection with still photography are equally applicable to motion pictures.

Referring now to FIG. 9, there is shown a television system, in accordance with the invention. From the electronic standpoint, this system is similar in its essential components to a standard black-and-white television system; hence, for purposes of simplicity, only the major elements are disclosed herein.

The system comprises a camera tube 36 which operates in conjunction with appropriate scanning circuits 37 and whose electrical output is fed to a video signal transmitter 38. The video signals radiated by transmitter 38 are intercepted by a television receiver 39 where they are demodulated and applied to a cathode-ray picture tube 40.

Camera tube 36 acts to convert light from an illuminated scene 41 to electrical signals. The tube serves two important functions, i.e., it converts the light values of the scene into corresponding electrical values, and it selects the impulses corresponding to picture elements in the proper scanning sequence. The camera tube shown is an image iconoscope, but it is to be understood that any conventional camera tube, such as an image orthicon, may be used in lieu thereof.

The object 41 to be televised is focussed by lens 42 onto a photocathode 43. Photocathode 43 is constituted by a transparent glass plate on which is sputtered a layer 44 of photo-sensitive material, such as cesium-silver. The layer is located on the side of the plate away from the object so that the light passing through the glass excites photoelectric emission from the rear of the sensitive layer. The electron image so formed is drawn by means of an electron lens 45 and a collector anode 46 down the length of the tube to the surface of a mosaic 47 directly opposite the cathode. This mosaic is capable of emitting secondary electrons when bombarded by the photoelectrons from the cathode.

The secondary emission from the mosaic 47 induces a charge image on the mosaic surface, which charge image is scanned by a beam of high velocity electrons directed to it from an electron gun 48 in the side arm of the tube, the beam being magnetically-deflected for scanning the image. The output signals yielded by the mosaic are fed to transmitter 38.

Thus far, the transmitter described is a conventional black-and-white signal generator. In accordance with the invention, color-analyzed black-and-white signals may be produced simply by making the glass plate of cathode 43 in the form of an ultra-microchrome analyzed of the type shown in FIG. 1, and sputtering a layer of photo-sensitive electron-emissive material on the surface of the glass plate facing the mosaic. Consequently, the optical image will pass through the ultra microchrome analyzer to form on the photo-sensitive material a color-analyzed electron image, and the black-and-white video signals yielded at the mosaic will be correspondingly color-analyzed.

It must be borne in mind that while the image iconoscope structure has been described as incorporating an ultra-microchrome filter, in lieu thereof a conventional tube may be used in conjunction with an external optical system including the color analyzer, whereby a color-analyzed optical image is projected onto the photocathode. Thus, as shown in FIG. 9a, light from the object 41 to be televised may be applied to an ulta-microchrome analyzer 43a by an objective lens 69, and the color-analyzed light is then cast by projection lens 42 onto a conventional photocathode 43 in a camera tube. It is to be further noted that the glass plate of the photocathode of an image orthicon tube may also be converted into a color analyzer in the manner disclosed in connection with the image iconoscope tube.

In the receiver, the image-reproducing or picture tube 40 comprises an evacuated envelope having a glass neck portion 70, a funnel-shaped metal shell 49 sealed at one end to the neck portion 70, and a glass screen 50 enclosing the other end of the shell. Situated in neck portion 48 is an electron gun 51, the beam of which impinges on a luminescent layer 52 on the inner wall of the screen 50. The layer 52 is formed of a phosphor which emits a white glow when the electron beam strikes it, the intensity of the light increasing with the velocity and density of the impinging electrons. The electron beam is similar to that employed in iconoscope camera tube 36 and is magnetically-deflected by means of scanning circuit 53 in synchronism with the camera-scanning beam, thereby tracing out the scanning pattern while the current in the beam is modulated in accordance with the incoming video signal. The phosphor layer 52 is preferably provided with an aluminized backing to increase by reflection the available light output.

Thus far, the receiver described is a conventional black-and-white picture-reproducing device. To derive color images from the incoming color-analyzed black-and-white signals, the glass screen 50 of the tube is processed to form a microchrome analyzer of the type described in conjunction with FIG. 1. It is important that the analyzer on the screen be in frame registration with that in the camera tube with respect to the optical image. This may readily be accomplished by electronic horizontal- and vertical-position control means whereby the black-and-white picture on the screen is shifted to the desired registration position. It is, of course, also possible to use an external.y-positioned analyzer, for example, in the form of a film or glass plate mounted on the outer face of the screen. Mechanical-adjustment means may be provided to manipulate the analyzer position relative to the screen to effect the desired registration.

The color-analyzed black-and-white image formed on the screen of the picture tube, in the absence of an analyzer, will to all appearances resemble a conventional black-and-white image. However, the addition of the ultra-microchrome analyzer will distribute the white light in the black-and-white image in accordance with its original color content, to produce a realistic color image recreating the original scene in all its color values.

For color fidelity, it is desirable that the white light produced by the phosphor screen be a flat white without noticeable color cast. For this purpose, a so-called "P6" type of phosphor is preferred, since such phosphors generate an even distribution of light throughout the visible spectrum, as is required for accurate reproduction of color values.

Where an analyzer is used, such as the glass plate in FIG. 1, wherein the spectral colors penetrate the glass in substantial depth, the television image, when viewed through such an analyzer, is seen in depth so that the image possesses a three-dimensional quality.

While there has been shown what is considered to be preferred embodiments of the invention, it is obvious that many changes and modifications may be made therein without departing from the true spirit of the invention. Thus, facsimile pictures may be transmitted by means of a color-analyzed black-and-white positive at the transmitting terminal to produce colored pictures at the receiving terminal. It is intended to cover all such changes and modifications in the scope of the appended claims.

What is claimed is:

1. A microchrome analyzer, comprising a photo-sensitive glass plate having recorded thereon a light-permeable symmetrical array of like, parallel stripes of microscopic width and in juxtaposed relation, each stripe being constituted by a rational color spectrum of hues in the order of their wavelength to define a selective color filter, said stripes in said array having a density of at least 100 stripes per inch of said plate whereby said plate has a generally white appearance by reason of optical fusion.

2. A microchrome analyzer, comprising a photo-sensitive glass plate having recorded thereon a light-permeable symmetrical array of like, parallel stripes of microscopic width and in juxtaposed relation, each constituted by a rational color spectrum of hues in the order of their wavelength to define a selective color filter, said stripes of said array having a density of at least 100 stripes per inch of said plate, said hues in said stripes penetrating the full depth of said plate.

References Cited in the file of this patent

UNITED STATES PATENTS

| | | |
|---|---|---|
| 1,768,812 | Whiting | July 1, 1930 |
| 1,836,787 | Berthon | Dec. 15, 1931 |
| 2,296,908 | Crosby | Sept. 29, 1942 |
| 2,422,778 | Finch | June 24, 1947 |
| 2,430,121 | Goodwin | Nov. 4, 1947 |
| 2,605,349 | Homrighous | July 29, 1952 |
| 2,657,257 | Lesti | Oct. 27, 1953 |
| 2,661,391 | Bedford | Dec. 1, 1953 |
| 2,666,806 | Kalfaian | Jan. 19, 1954 |
| 2,674,651 | Creamer | Apr. 6, 1954 |
| 2,683,769 | Banning | July 13, 1954 |
| 2,700,697 | Houghton | Jan. 25, 1955 |
| 2,717,918 | Anderson | Sept. 13, 1955 |
| 2,809,570 | Dearing et al. | Oct. 15, 1957 |